United States Patent
Hattass et al.

(10) Patent No.: US 10,241,323 B2
(45) Date of Patent: Mar. 26, 2019

(54) MICROMECHANICAL DEVICE AND METHOD FOR THE TWO-DIMENSIONAL DEFLECTION OF LIGHT

(71) Applicant: Robert Bosch GmbH, Stuttgart (DE)

(72) Inventors: Mirko Hattass, Stuttgart (DE); Robert Maul, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/688,038

(22) Filed: Aug. 28, 2017

(65) Prior Publication Data

US 2018/0067304 A1 Mar. 8, 2018

(30) Foreign Application Priority Data

Sep. 7, 2016 (DE) .................. 10 2016 216 925

(51) Int. Cl.
*G02B 26/08* (2006.01)
*G02B 7/182* (2006.01)
*G02B 26/10* (2006.01)

(52) U.S. Cl.
CPC ......... *G02B 26/0858* (2013.01); *G02B 7/182* (2013.01); *G02B 26/101* (2013.01)

(58) Field of Classification Search
CPC .............. G02B 26/0841; G02B 26/105; G02B 26/085; G02B 26/0858; G02B 26/0833; G02B 26/101

See application file for complete search history.

(56) References Cited

U.S. PATENT DOCUMENTS

2008/0239252 A1* 10/2008 Konno ............... G02B 17/0621
353/98

FOREIGN PATENT DOCUMENTS

WO 2012089387 A1 7/2012

* cited by examiner

*Primary Examiner* — Jennifer D. Carruth
(74) *Attorney, Agent, or Firm* — Norton Rose Fulbright US LLP; Gerard Messina (57) ABSTRACT

A micromechanical device and a method for the two-dimensional deflection of light. The device includes a mirror unit having a mirror surface for deflecting light striking the mirror surface; the mirror unit being rotatably situated about a first axis within a first frame unit and being fastened to the first frame unit; the first frame unit being rotatably situated about a second axis within an actuator structure and being fastened to the actuator structure; the actuator structure including at least four piezoelectric actuator units; and the positions of the at least four piezoelectric actuator units being situated symmetrically with respect to the first axis and also with respect to the second axis.

24 Claims, 3 Drawing Sheets

MICROMECHANICAL DEVICE AND METHOD FOR THE TWO-DIMENSIONAL DEFLECTION OF LIGHT

CROSS REFERENCE

The present application claims the benefit under 35 U.S.C. § 119 of German Patent Application No. DE 102016216925.4 filed on Sep. 7, 2016, which is expressly incorporated herein by reference in its entirety.

FIELD

The present invention relates to a micromechanical device and a method for the two-dimensional deflection of light. A two-dimensional deflection of light is intended to mean, in particular, a deflection of light, in which an endpoint of the light may scan not only a line within a plane, but also a two-dimensional surface in a plane. The two-dimensional deflection of light, as related to the entire light beam, from its source to the endpoint thereof, may be described in such a way that the two-dimensional deflectable light beam spans not only a plane in a three dimensional space, but may also scan a three-dimensional solid angle.

BACKGROUND INFORMATION

Micro-mirrors, which may be moved about two axes by suitable micromechanical drive structures, possess at least one combination of physically varying drive concepts. A magnetic drive may be used for a first axis, for example, and a piezoelectric drive may be used for a second axis.

A magnetically drivable micro-mirror is described in PCT Application No. WO 2012/089387 A1, which is employable in a 2D scanner.

SUMMARY

The present invention relates to a micromechanical device and a method including the features described herein.

In accordance with the present invention, an example micromechanical device for the two-dimensional deflection of light is provided, including: a mirror unit having a mirror surface for deflecting light striking the mirror surface; the mirror unit, in particular, the mirror surface, being rotatably situated about a first axis within a first frame unit and being fastened to the first frame unit; the first frame unit being rotatably situated about a second axis within an actuator structure and being fastened to the actuator structure; the actuator structure including at least four piezoelectric actuator units; and the position of the at least four actuator units being situated symmetrically both with respect to the first axis and with respect to the second axis.

The present invention also provides a method for the two-dimensional deflection of light, including the steps: providing a micromechanical device according to the present invention; applying a first periodic voltage signal to a first piezoelectric actuator unit of the at least four piezoelectric actuator units; applying a second periodic voltage signal to a second piezoelectric actuator unit of the at least four piezoelectric actuator units; the first voltage signal and the second voltage signal being applied in such a way that a respective instantaneous amplitude of the second voltage signal is either equal to a respective instantaneous amplitude of the first voltage signal or is equal to the respective instantaneous amplitude of the first voltage signal multiplied by −1.

In other words, at any point in time at which the micromechanical device is operated with the aid of the method, the first voltage signal is either equal to the second voltage signal or equal to the negative of the second voltage signal.

Providing the micromechanical device in the manner according to the present invention enables a decoupling of angular momenta on the mirror surface of the micromechanical device from an external object to which the micromechanical device is attached, for example, to a housing. An angular momentum partially transferred from the mirror surface to external objects may result in energy losses due to the undesirable kinetic energy present on the external object, as well as to undesirable noise generation, for example, to a whistling, if moveable parts are periodically excited. As a result of the decoupling made possible in the present case, a reduction in power consumption of the micromechanical device may be achieved.

The micromechanical device according to the present invention can also use particularly minimal space, which may result in a higher usability and less time expenditure and material expenditure during manufacture. The device according to the present invention may be particularly drastically miniaturized, and may therefore be easily used, for example, in devices having a high integration density, in particular, mobile devices such as smartphones, data goggles, micro-projectors and/or in other such devices.

The micromechanical device according to the present invention may also have a relatively minimal geometrical complexity and thus is particularly robust against operational errors and damages.

In addition, with the advantageous miniaturization of the micromechanical devices according to the present invention, it is possible to manufacture more devices simultaneously per wafer.

Additional advantages result from the description herein with reference to the figures.

According to one preferred refinement, the dimensions of the at least four piezoelectric actuator units are identical in a first direction in parallel to the first axis. Thus, symmetrical or anti-symmetrical oscillation modes and/or deformation modes may be advantageously formed in the entire frame unit, whereby a particularly efficient two-dimensional deflection of light may result. Alternatively or in addition, the dimensions of the at least four piezoelectric actuator units may also be identical in a second direction in parallel to the second axis.

In other words, in particular, all, at least four piezoelectric actuator units may be designed having identical dimensions in the first direction and in the second direction. For reasons of symmetry, the piezoelectric actuator units are advantageously designed equal in size in all spatial dimensions.

According to another preferred refinement, each of the piezoelectric actuator units is connected via a respective bending beam to the rest of the micromechanical device. A bending beam is understood to mean, in particular, an elongated structure, which is suitable for and configured to bend during an intended operation in a direction perpendicular to a longitudinal axis of the elongated shape of the bending beam. Each bending beam may also be referred to as a bending spring. Thus, the mirror surface may be acted upon by an angular momentum via the bending beam as a result of piezoelectric deformation of the respective piezoelectric actuator unit.

According to another preferred refinement, the first frame unit is connected to the actuator structure via two torsion beams. Each of the torsion beams may engage a respective area of the actuator structure, in which two bending beams each, via which piezoelectric actuator units are connected to the rest of the micromechanical device, meet. A torsion beam is understood to mean, in particular, an elongated structure, which is suitable for and configured to twist about an axis in parallel to a longitudinal axis of the elongated structure during an intended use. The torsion beams are therefore also referable to as torsion springs.

Thus, a torque is particularly efficiently exertable on the mirror surface via the two piezoelectric actuator units on the two bending beams on the respective torsions beam, in order to apply an angular momentum to the mirror surface.

The actuator structure is preferably made up of two parts, each part including two piezoelectric actuator units each and the two corresponding bending beams, which meet at one torsion beam each of the torsion beams of the first frame unit. The first part and the second part of the actuator structure are preferably spaced apart from one another, in particular, by the first frame unit.

According to another preferred refinement, the piezoelectric actuator units are designed with a rectangular shape with two shorter sides and two longer sides. Each of the bending beams preferably engages each actuator unit on a respective end of one of the longer sides of the rectangular shape of the piezoelectric actuator units. In this way, the torque generated on each of the actuator units is more efficiently applicable via each bending beam to the first frame unit and/or to the mirror surface.

According to another preferred refinement, the piezoelectric actuator units are electrically contacted with the aid of electrical lines in such a way that one voltage each is applicable at each of the actuator units via the electrical lines in a direction, which is oriented perpendicular on a plane, which is spanned by the first and the second axis. Thus, the mirror surface may be particularly efficiently acted upon with an angular momentum, which includes components in the first direction in parallel to the first axis and/or in the second direction in parallel to the second axis.

According to another preferred refinement, the piezoelectric actuator units are electrically contacted with the aid of the electrical lines in such a way that a periodic electrical signal having the same instantaneous amplitude value and in each case having either positive or negative signs is applicable at each of the actuator units.

According to another preferred refinement of the method according to the present invention, a third periodic voltage signal is applied to a third piezoelectric actuator unit of the at least four piezoelectric actuator units, and a fourth periodic voltage signal is applied to a fourth piezoelectric actuator unit of the at least four piezoelectric actuator units. The third voltage signal and the fourth voltage signal may be applied in such a way that a respective instantaneous amplitude of the fourth voltage signal is either equal to a respective instantaneous amplitude of the third voltage signal or is equal to the respective instantaneous amplitude of the third voltage signal multiplied by −1. In this way, particularly advantageous symmetrical and/or anti-symmetrical oscillation modes may be generated in the actuator units, in the first frame unit and/or in the mirror surface.

According to another preferred refinement, the first voltage signal and the third voltage signal are applied in such a way that a respective instantaneous amplitude of the third voltage signal is either equal to the respective instantaneous amplitude of the first voltage signal or is equal to the respective instantaneous amplitude of the first voltage signal multiplied by −1.

A voltage signal having the same absolute amplitude value is particular preferably applied to each of the piezoelectric actuator units at any instantaneous point in time, the first voltage signal up to and including the fourth voltage signal at the first piezoelectric actuator unit up to and including the fourth piezoelectric actuator unit each being distinguished by the fact that they have either a positive sign or a negative sign.

BRIEF DESCRIPTION OF THE DRAWINGS

The present invention is described in greater detail below with reference to exemplary embodiments depicted in the figures.

In all figures, identical or functionally identical elements and devices—unless indicated otherwise—are provided with the same reference numerals. The method steps are numbered for purposes of clarity and are not intended, unless indicated otherwise, to imply a certain chronological sequence. In particular, multiple method steps may be carried out simultaneously.

DETAILED DESCRIPTION OF EXAMPLE EMBODIMENTS

Figure 1:
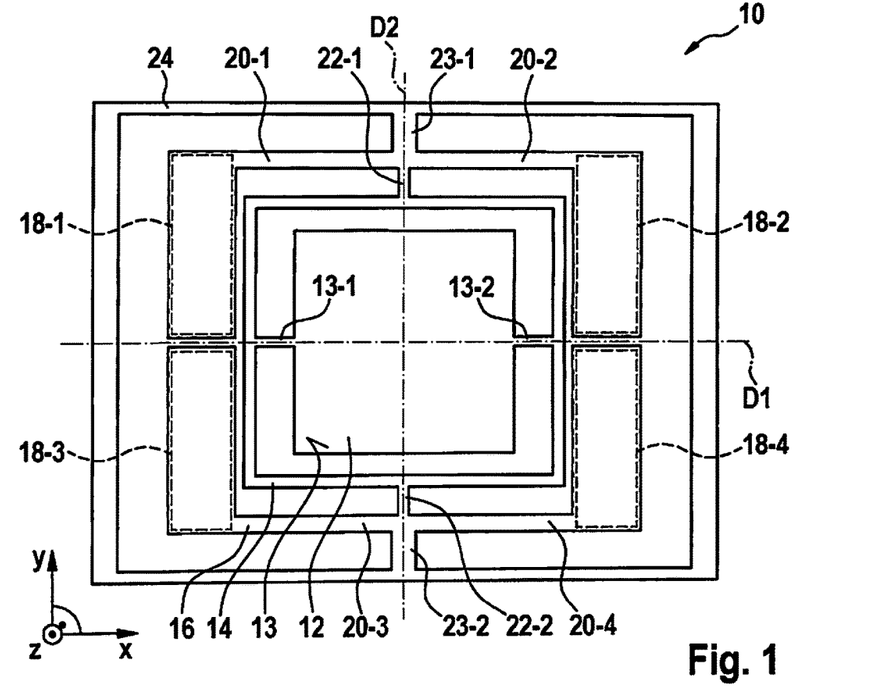
FIG. 1 schematically shows a top view of a micromechanical device for the two-dimensional deflection of light according to one specific embodiment of the present invention.

FIG. 1 schematically shows a top view of a micromechanical device 10 for the two-dimensional deflection of light according to one specific embodiment of the present invention.

Micromechanical device 10 includes a mirror unit 12 having a mirror surface 13 for deflecting light striking mirror surface 13. Mirror surface 13 may, for example, have a metallic surface, may include multiple dielectric layers having various refractive indices and/or may be otherwise designed as light-reflective for reflecting the incident light.

Mirror unit 12 is rotatably connected with a first frame unit 14 about a first axis D1. Mirror unit 12 is situated within first frame unit 14 in a rest position of micromechanical device 10. Where geometric configurations of various elements of the micromechanical device 10 according to the present invention are described here and below, such descriptions, unless it is explicitly stated to the contrary, are intended to relate in each case to a resting state of micromechanical device 10. Thus, it is possible that when one or multiple elements of micromechanical device 10 are moved during operation of device 10, no longer do all elements exhibit the described geometric relations to one another. On the other hand, micromechanical device 10 may, however, also be designed in such a way that in a rest position of micromechanical device 10, the described geometric relations are not maintained, that these relations are assumed, however, at certain points in time during the operation of micromechanical device 10.

Mirror unit 12 is advantageously connected via short torsion beams 13-1, 13-2 to first frame unit 14, as shown in FIG. 1. Torsion beams 13-1, 13-2 are situated in parallel and congruent with first axis D1. Torsion beams 13-1, 13-2 are preferably equal in size and have, in particular, a length, which is shorter than a side length of mirror unit 12 in the paper plane depicted in FIG. 1, in particular, shorter than half of a side surface, particularly preferably shorter than a quarter of the side surface.

Mirror unit 12 is rotatably suspended opposite first frame unit 14 via torsion beams 13-1, 13-2 and connected to the rest of micromechanical device 10 only via torsion beams 13-1, 13-2.

First frame unit 14 includes two additional torsion beams 22-1, 22-2. Additional torsion beams 22-1, 22-2 are situated in parallel and congruent with a second axis D2, so that first frame unit 14, together with mirror unit 12, is rotatably suspended about second axis D2 with the aid of the two additional torsion beams 22-1, 22-2. Mirror unit 12, torsion beams 13-1, 13-2 and first frame unit 14 are connected to the rest of micromechanical device 10 solely via additional torsion beams 22-1, 22-2.

The first direction parallel to first axis D1 is also referred to as x-direction. The second direction parallel to second axis D2 is also referred to as y-direction. The x-direction and the y-direction are particularly preferably situated perpendicular to one another. Additional torsion beams 22-1, 22-2 are also designed, in particular, with a length, which is shorter than a side surface of mirror unit 12 in the x-direction and/or in the y-direction.

In device 10 according to FIG. 1, mirror unit 12 and mirror surface 13 are depicted as square and first frame unit 14 is also depicted as a square frame, which surrounds mirror unit 12 and mirror surface 13. It shall be understood that mirror unit 12 and/or mirror surface 13, as well as first frame unit 14 may also have other shapes, for example, a rectangular shape. Square shapes may be particularly advantageous for forming oscillation modes on mirror surface 13. Depending on the desired application, however, a different, for example, a rectangular shape may also be advantageous, for example, in order to compensate for a greater or lesser rotatability (for example due to a greater or lesser torsion spring stiffness) relative to a rotation axis D1, D2.

Micromechanical device 10 also includes an actuator structure 16. Actuator structure 16 is used, in particular, for applying an angular momentum to mirror unit 12, in particular, mirror surface 13, via at least the elements of device 10 described above. The angular momentum may include, in particular, components in both the x-direction as well as in the y-direction for the two-dimensional deflection of light.

In the specific embodiment depicted in FIG. 1, actuator structure 16 is made up of two parts separate from one another. Actuator structure 16 includes four piezoelectric actuator units 18-1, 18-2, 18-3, 18-4, which are also referred to in part below together as 18-$i$. All four piezoelectric actuator devices 18-$i$ in micromechanical device 10 have a rectangular cross section in an x-y plane. An x-y plane is understood to be a plane, which is spanned by the x-direction and the y-direction in FIG. 1. In micromechanical device 10, the rectangular cross sections of piezoelectric actuator units 18-$i$ each also include a longer side (referred to as "length") in parallel to second axis D2 and a shorter side (referred to as "width") in parallel to first axis D1. Preferably all piezoelectric actuator units 18-$i$ have the same length and the same width.

In addition, piezoelectric actuator units 18-$i$ are situated in such a way that the entire assembly of piezoelectric actuator units 18-$i$ is designed symmetrically both with respect to first axis D1 and with respect to second axis D2.

In FIG. 1, it is depicted that a first piezoelectric actuator unit 18-1 and a second piezoelectric actuator unit 18-2 are situated on one side of first axis D1 and a third piezoelectric actuator unit 18-3 and a fourth piezoelectric actuator unit 18-4 are situated on the other side of first axis D1 in such a way that first actuator unit 18-1 and second actuator unit 18-2 are situated in mirror image to third piezoelectric actuator unit and fourth piezoelectric actuator 18-3, 18-4 with respect to first axis D1.

It is also depicted in FIG. 1 that first piezoelectric actuator unit 18-1 and third piezoelectric actuator unit 18-3 are situated on one side of second axis D2 and second piezoelectric actuator unit 18-2 and fourth piezoelectric actuator unit 18-4 are situated on the other side of second axis D2 in such a way that first actuator unit 18-1 and third actuator unit 18-3 are situated in mirror image to second piezoelectric actuator unit 18-2 and fourth piezoelectric actuator unit 18-4 with respect to axis D2.

In addition, each of piezoelectric actuator units 18-$i$ in micromechanical device 10 are connected to the rest of micromechanical device 10 exclusively via a respective bending beam 20-$i$. Bending beams 20-$i$ are preferably designed in such a way that each bending beam 20-$i$ of each piezoelectric actuator device 18-$i$ engages each piezoelectric actuator 18-$i$ at a respective end of a respective longer side of piezoelectric actuator unit 18-$i$, i.e., are connected there to respective piezoelectric actuator unit 18-$i$.

A first bending beam 20-1 of first piezoelectric actuator unit 18-1 and a second bending beam 20-2 of second piezoelectric actuator unit 18-2 meet at a respective end of each bending beam 20-1, 20-2 which points away from respective actuator unit 18-1, 18-2, in each case in an area in which one of additional torsion beams 22-1 also engages an edge [sic; end] of torsion bar 22-1, which points away from first frame unit 14.

A third bending beam 20-3 of third piezoelectric actuator unit 18-3 and a fourth bending beam 20-4 of fourth piezoelectric actuator unit 18-4 meet at a respective end of bending beam 20-3, 20-4, which points away from respective actuator unit 18-3, 18-4, in each case in an area in which one of additional torsion beams 22-2 also engages an end of torsion bar 22-2, which points away from first frame unit 14.

Yet another torsion beam 23-1, continuing from mirror unit 12, is also situated in the area in which first bending beam 20-1 and second bending beam 20-2 and torsion beam 22-1 meet. Yet another torsion beam 23-2, continuing from mirror unit 12, is also situated in the area in which third bending beam 20-3 and fourth bending beam 20-4 and torsion bar 22-2 meet.

Torsion beams 23-1, 23-2, like torsion beams 22-1, 22-2, are also situated in parallel and congruent with second axis D2. Actuator unit 16, i.e., piezoelectric actuator units 18-$i$ and bending beams 20-$i$, as well as torsion beams 22-1, 22-2, first frame unit 14, torsion beams 13-1, 13-2 and mirror unit 12 are connected to the rest of micromechanical device 10 solely via torsion beams 23-1, 23-2, specifically rotatably mounted about second axis D2.

Torsion beams 23-1, 23-2 are connected at a respective end continuing from mirror unit 12 to a second frame unit 24 of micromechanical device 10. Micromechanical device 10 may be fastened via second frame unit 24 to external elements, for example, to elements with which micromechanical device 10 together forms a light scanner. With the advantageous design of micromechanical device 10, the angular momentum, which is applied to mirror surface 13, is not transmitted or transmitted to a particularly minimal extent, to second frame unit 24, so that the energy saving effects and noise reduction effects described above may be achieved.

Torsion beams 23-1, 23-2 are preferably designed having a width, perpendicular to second axis D2, in particular, in parallel to first axis D1, which is greater than a corresponding width of torsion beams 22-1, 22-2.

In this way, a torque applied to second frame unit 24 from the interior of micromechanical device 10 may be further reduced. Alternatively or in addition, torsion beams 23-1 23-2 may be designed otherwise, for example, as a result of their material properties, with a higher torsion stiffness than torsion beams 22-1, 22-2.

Piezoelectric actuator units 18-i may be designed in detail as is described below with reference to FIG. 2a) and FIG. 2b).

Figure 2A:
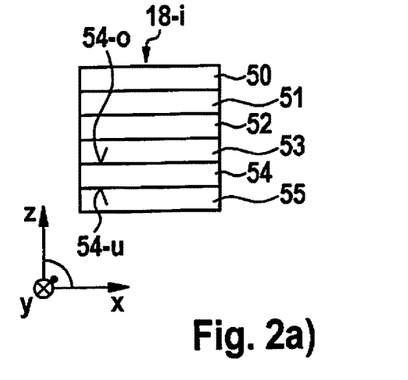
FIG. 2a) schematically shows a cross sectional view through a piezoelectric actuator unit according to a first variant of the micromechanical device from FIG. 1.

FIG. 2a) schematically shows a cross sectional view through a piezoelectric unit 18-i according to a first variant of micromechanical device 10. A cross sectional depiction is shown in the x-z plane, which is spanned by the x-direction and a z-direction, the z-direction being situated in such a way that the x-direction, the y-direction and the z-direction form an orthogonal, three-dimensional coordinate system. In FIG. 1, the z-direction projects out of the paper plane.

According to FIG. 2a), piezoelectric actuator unit 18-i may be designed on and with a substrate layer 54. Substrate layer 54 may, for example, be a silicon substrate. All elements of micromechanical device 10 described above with reference to FIG. 1 are particularly preferably formed from one and the same substrate layer 54, with the exception of parts of piezoelectric actuator unit 18-i, as described below, and with the exception of electrical lines to piezoelectric actuator units 18-i and to mirror surface 13.

Substrate 54 of piezoelectric actuator unit 18-i may, in particular, be designed as one piece with each bending beam 20-i leading to actuator unit 18-i from the same substrate. Bending beams 20-i may be designed, in particular, as one piece with torsion beams 22-1, 22-2 and or with torsion beams 23-1, 23-2 from the same substrate. Torsion beams 23-1, 23-2 may be designed, in particular, as one piece from the same substrate as second frame unit 24. Torsion beams 22-1, 22-2 may be designed, in particular, as one piece from the same substrate as first frame unit 14. First frame unit 14 may be designed, in particular, as one piece from the same substrate as torsion beams 13-1, 13-2. Torsion beams 13-1, 13-2 may be designed, in particular, from the same substrate as a support structure of mirror unit 12, on which mirror surface 13 is situated.

A first electrode 55 may be situated on a first outer side 54-u of substrate layer 54 as part of piezoelectric actuator unit 18-i. The following, preferably partly structured, layers 53 through 50 may be situated on a second outer side 54-o of substrate layer 54 pointing away from first outer side 54-u of substrate layer 54 in this order: a first piezoelectric layer 53, an oxide layer 52, a second piezoelectric layer 51 and a second electrode 50. By applying a voltage signal between first electrode 55 and second electrode 50, a voltage is thus applicable to first piezoelectric layer 53 and second piezoelectric layer 51, as a result of which an actuation of piezoelectric actuator unit 18-i takes place.

Figure 2B:
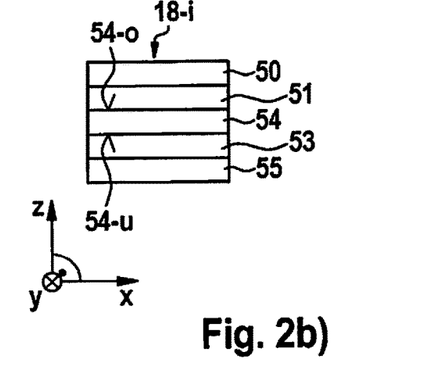
FIG. 2b) schematically shows a cross sectional view through a piezoelectric actuator according to a second variant of the micromechanical device from FIG. 1.

FIG. 2b) shows another variant, according to which piezoelectric actuator units 18-i of micromechanical device 10 may be designed.

FIG. 2b) also schematically shows a cross section in the x-z plane. Piezoelectric actuator unit 18-i in the variant according to FIG. 2b) also includes a substrate layer 54, which may be designed, in particular, as described with reference to substrate 54 in FIG. 2a), and which therefore may be designed as one piece from the same substrate, in particular, with one or with a plurality of additional element(s) of micromechanical device 10.

According to FIG. 2b), a first piezoelectric layer 53 is first situated on a first outer side 54-u of substrate 54, and then a first electrode 55, i.e., first piezoelectric layer 53 is sandwiched between substrate layer 54 and first electrode 55. Similarly, a second piezoelectric layer 51 is initially situated on a second outer side 54-o of substrate layer 54, which faces away from first outer side 54-u of substrate 54, and then a second electrode 50. This means, second piezoelectric layer 51 is sandwiched between substrate layer 54 and second electrode 50. Thus, in this variant as well, a voltage may be applied to two piezoelectric layers 53, 51 by applying a voltage signal between first electrode 55 and second electrode 50, as a result of which piezoelectric actuator unit 18-i is actuated.

It shall be understood that the depictions in FIG. 2a) and FIG. 2b) serve merely to illustrate the layer structures of actuator units 18-i and are not intended to show actual structurally correctly depicted cross sections. One or multiple of depicted layers 50-55 may, in particular, be designed in x-direction having various widths, may include respective recesses and so forth.

Voltage signals may be applied to each of piezoelectric actuators 18-i, in particular, as described below with reference to a method according to the present invention for the two-dimensional deflection of light. It shall be understood that micromechanical device 10 includes electrical lines, which are designed so that each of electrodes 50, 55 of each of piezoelectric actuator unit 18-i is contactable with the aid of the electrical lines. The electrical lines, which are not depicted in FIG. 1 for reasons of clarity, may be designed, in particular, entirely or in part along various surfaces of the elements of micromechanical device 10 depicted in FIG. 1.

All piezoelectric actuator units 18-i in device 10 are advantageously designed in such a way that for all piezoelectric actuator units 18-i, first electrode 55 is situated in each case on the same side of substrate layer 54 and, for all actuator units 18-i, second electrode 50 is situated on the other side of substrate 54. A voltage signal is understood below to mean a voltage signal having a positive value, according to which a voltage drop having a higher potential is present at first electrode 55 and a voltage drop having a lower electrical potential is present at second electrode 50.

In other words, a positive voltage signal is a voltage signal, which causes a voltage drop in the positive z-direction.

It shall be understood that one or multiple of piezoelectric actuator units 18-i may also be designed having layering variants different from the remaining piezoelectric actuator units 18-i, for example, inverted with respect to the outer sides 54-u, 54-o of substrate 54, i.e., having a mirror-image arrangement on substrate 54.

Figure 3:
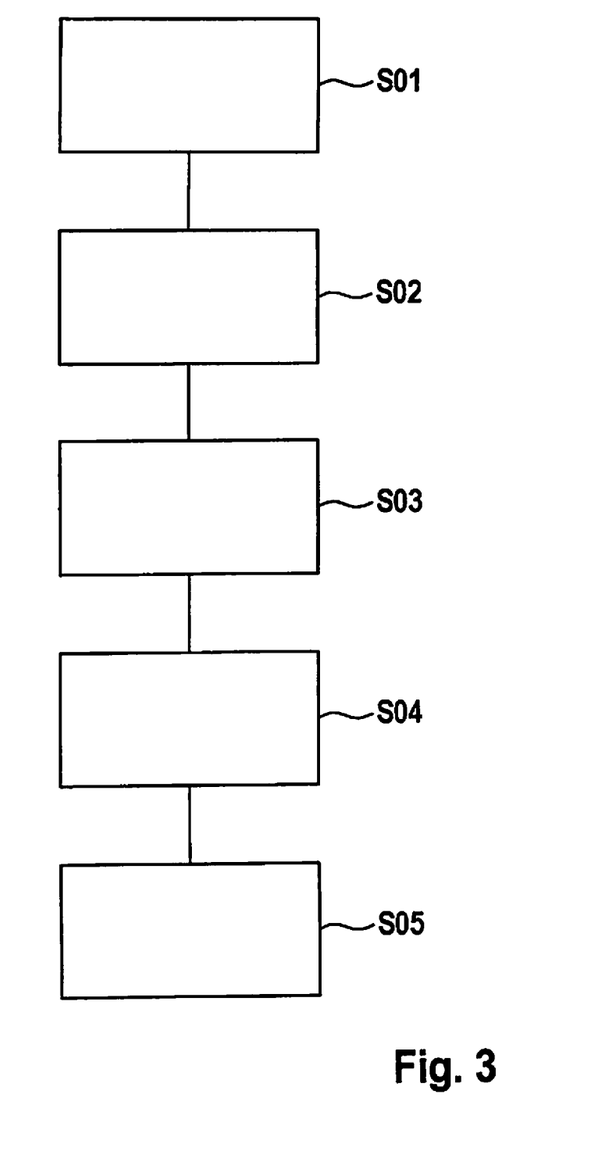
FIG. 3 schematically shows a flow chart for elucidating a device for the two-dimensional deflection of light according to another specific embodiment of the present invention.

FIG. 3 schematically shows a flow chart for elucidating a device for the two-dimensional deflection of light according to another specific embodiment of the present invention.

In the method according to FIG. 3, a micromechanical device according to the present invention, for example, micromechanical device 10, is provided in a step S01.

In a step S02, a first periodic voltage signal is applied to first piezoelectric actuator unit 18-1. In a second step S03, a second periodic voltage signal is applied to second piezoelectric actuator unit 18-2. In a step S04, a third periodic voltage signal is applied to third piezoelectric actuator unit

18-3. In a step S05, a fourth periodic voltage signal is applied to fourth piezoelectric actuator unit 18-4. At least two of the voltage signals are preferably always applied simultaneously. Either two voltage signals or four voltage signals, in particular, are applied simultaneously in each case.

Figure 4:
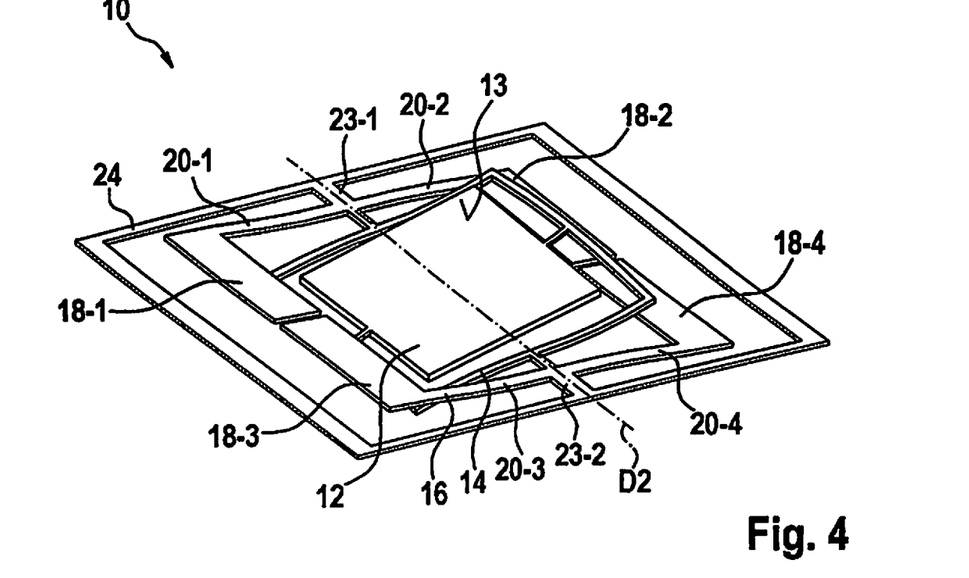
FIGS. 4 and 5 schematically show three-dimensional diagonal views of the micromechanical device from FIG. 1 during the operation with the method according to FIG. 3.
Figure 5:
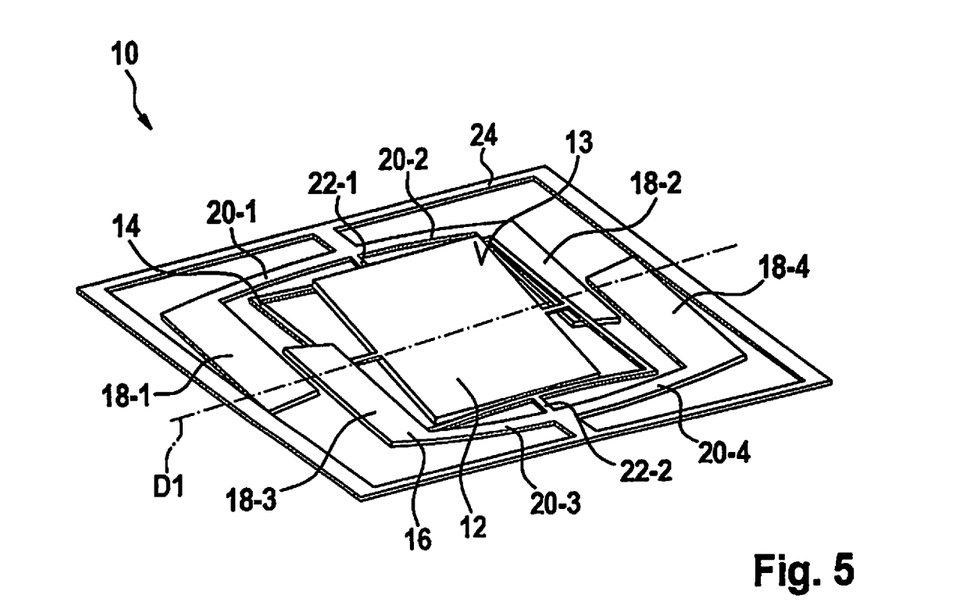

The voltage signals may be applied, in particular, as is described below also with reference to FIGS. 4 and 5. FIGS. 4 and 5 each show three-dimensional schematic diagonal views of micromechanical device 10 according to FIG. 1 during the operation with the method according to FIG. 3.

FIG. 4 schematically shows an operation of micromechanical device 10, in which mirror surface 13 is rotated periodically about second axis D2, for example, in order to deflect in the x-direction a light beam striking mirror surface 13.

As mentioned above, each of piezoelectric actuator units 18-*i* in micromechanical device 10 according to FIG. 1 is advantageously identically designed, in particular, with respect to the layering configuration in the z-direction. In this case, the movement of mirror surface 13 about first axis D1 schematically depicted in FIG. 4 may be produced as a result of the same periodic voltage signal being applied to first piezoelectric actuator unit 18-1 and to second piezoelectric actuator unit 18-2, i.e., in each case having the same instantaneous amplitude and the same mathematical sign.

Similarly, the same periodic signal, i.e. in each case having the same instantaneous amplitude and the same mathematical sign, is applied simultaneously to third piezoelectric actuator unit 18-3 and to fourth piezoelectric actuator unit 18-4, the voltage signal applied to third actuator unit 18-3 and fourth actuator unit 18-4 being exactly the voltage signal applied to first actuator unit 18-1 and to second actuator unit 18-2 multiplied by −1. In other words, a signal having the same absolute amplitude value is applied to each of piezoelectric actuator units 18-*i*, the signal applied to first actuator unit 18-1 and to second actuator unit 18-2 in each case having the inverse mathematical sign of that of the voltage signal applied to third actuator unit 18-3 and to actuator unit 18-4.

As schematically depicted in FIG. 4, it may be that parts of actuator structure 16 move counter to mirror surface 13 and thus, on the whole, only a minimal resulting torque, or no torque at all, is exerted via torsion beams 23-1, 23-2 on second frame unit 24.

A movement of mirror surface 13 about second axis D2 may be produced by the same periodic voltage signal being applied to first piezoelectric actuator unit 18-1 and to third piezoelectric actuator unit 18-3, i.e., in each case having the same instantaneous amplitude and the same mathematical sign.

Similarly, the same periodic voltage signal i.e., in each case having the same instantaneous amplitude and the same mathematical sign, is applied simultaneously to second piezoelectric actuator unit 18-2 and to fourth piezoelectric actuator unit 18-4, the voltage signal applied to second actuator unit 18-2 and to fourth actuator unit 18-4 being exactly the voltage signal applied to first actuator unit 18-1 and to third actuator unit 18-3 multiplied by −1. In other words, a signal having the same absolute amplitude value is applied to each of piezoelectric actuator units 18-*i*, the signal applied to first actuator unit 18-1 and to third actuator unit 18-3 in each case having the inverse mathematical sign of that of the voltage signal applied to third actuator unit 18-2 and to actuator unit 18-4.

By applying voltage signals identical in terms of absolute value of amplitude but different in terms of mathematical sign as described, advantageous eigenmodes of micromechanical device 10 in particular, of the elements of micromechanical device 10 with the exception of second frame unit 24, may be produced, on the basis of which mirror surface 13 carries out desired movements for deflecting light beams striking mirror surface 13. More complex eigenmodes may also be excited, which cause a movement of mirror surface 13 both about first axis D1 and about second axis D2. For this purpose, the voltage signals may be applied to actuator units 18-*i* in a specific clock scheme, for example, in a multiplex mode.

When designing and arranging piezoelectric actuator units 18-*i* in a modified manner compared to the preceding description, it is possible to correspondingly adapt the application of the voltage signals, in order to produce the desired movement modes of mirror surface 13.

What is claimed is:

1. A micromechanical device for the two-dimensional deflection of light, comprising:
   a first frame unit;
   an actuator structure that includes at least four piezoelectric actuator units; and
   a mirror unit that:
      has a mirror surface for deflecting light striking the mirror surface; and
      is rotatably situated about a first axis of rotation within, and fastened to, the first frame unit;
   wherein:
      the first frame unit is rotatably situated about a second axis of rotation within, and fastened to, the actuator structure;
      the at least four piezoelectric actuator units are positioned symmetrically both with respect to the first axis and with respect to the second axis; and
      any one or more of the following four features (a)-(d):
         (a) a direction in which one of the first and second axes extends is parallel to respective directions in which respective central longitudinal axes of the at least four piezoelectric actuator units extend;
         (b) different ones of the at least four piezoelectric actuator units are simultaneously movable so that their respective central longitudinal axes, which, when the micromechanical device is at rest, all extend along and within a same plane, instead simultaneously extend along and within respective planes, of which at least two are different than each other;
         (c) for each of the at least four piezoelectric actuator units, the respective piezoelectric actuator unit is actuatable by application of voltage between a respective pair of electrodes between which piezoelectric material of the respective piezoelectric actuator unit is arranged; and
         (d) the at least four piezoelectric actuator units include first, second, third, and fourth piezoelectric actuator units arranged to:
            respond to application of a first set of voltages by (1) the first and second piezoelectric actuator units shifting in a first direction that is perpendicular to the first and second axes and (2) the third and fourth piezoelectric actuator units shifting in an opposite second direction that is perpendicular to the first and second axes; and
            respond to application of a second set of voltages by (1) the second and fourth piezoelectric actuator units shifting in the first direction and (2) the first and third piezoelectric actuator units shifting in the second direction.

2. The device as recited in claim 1, wherein the dimensions of the at least four piezoelectric actuator units are identical in a first direction in parallel to the first axis, and the dimensions of the at least four piezoelectric actuator units are identical in a second direction in parallel to the second axis.

3. The device as recited in claim 1, wherein each of the piezoelectric actuator units is connected via one bending beam each to the rest of the device.

4. The device as recited in claim 3, wherein the first frame unit is connected to the actuator structure via two torsion beams, and wherein each of the torsion beams engages in a respective area of the actuator structure, in which two bending beams each meet.

5. The device as recited in claim 3, wherein the piezoelectric actuator units have a rectangular shape with two shorter sides and two longer sides, and each of the bending beams engage the respective actuator unit on a respective end of one of the longer sides.

6. The device as recited in claim 1, wherein the piezoelectric actuator units are electrically contacted with the aid of electrical lines in such a way that a respective voltage is applicable to each of the actuator units via the electrical lines in a direction that is oriented perpendicular to a plane spanned by the first axis and the second axis.

7. The device as recited in claim 1, wherein the piezoelectric actuator units are electrically contacted with the aid of electrical lines in such a way that a periodic electrical signal having the same amplitude and having an adjustable, relative phase shift of 0° or 180°, respectively, is applicable to each of the actuator units.

8. The device as recited in claim 1, wherein the direction in which the one of the first and second axes extends is parallel to the respective directions in which the respective central longitudinal axes of the at least four piezoelectric actuator units extend.

9. The device as recited in claim 8, wherein the one of the first and second axes is the second axis.

10. The device as recited in claim 1, wherein each of the longitudinal axes of the at least four piezoelectric actuator units is either parallel to or the same as all others of the longitudinal axes of the at least four piezoelectric actuator units.

11. The device as recited in claim 1, wherein a longitudinal axis of at least one of the at least four piezoelectric actuator units is the same as that of at least one other of the at least four piezoelectric actuator units.

12. The device as recited in claim 1, wherein the different ones of the at least four piezoelectric actuator units are simultaneously movable so that their respective central longitudinal axes extend along and within the different respective planes that include the planes that are non-parallel to each other.

13. The device as recited in claim 1, wherein for each of the at least four piezoelectric actuator units, the respective piezoelectric actuator unit is actuatable by the application of voltage between the respective pair of electrodes between which the piezoelectric material of the respective piezoelectric actuator unit is arranged.

14. The device as recited in claim 13, wherein for each of the piezoelectric actuator units, the respective applied voltage is applied between the respective pair of electrodes through the piezoelectric material in a direction that is perpendicular to each of the first and second axes.

15. The device as recited in claim 1, wherein the at least four piezoelectric actuator units include the first, second, third, and fourth piezoelectric actuator units arranged to:
respond to the application of the first set of voltages by (a) the first and second piezoelectric actuator units shifting in the first direction and (b) the third and fourth piezoelectric actuator units shifting in the opposite second direction; and
respond to application of a second set of voltages by (a) the second and fourth piezoelectric actuator units shifting in the first direction and (b) the first and third piezoelectric actuator units shifting in the second direction.

16. A method for the two-dimensional deflection of light using a micromechanical device, the micromechanical device including (a) a first frame unit, (b) an actuator structure that includes at least four piezoelectric actuator units, and (c) a mirror unit that (1) has a mirror surface for deflecting light striking the mirror surface, and (2) is rotatably situated about a first axis within, and fastened to, the first frame unit, the first frame unit being rotatably situated about a second axis within, and fastened to, the actuator structure, wherein the at least four piezoelectric actuator units are positioned symmetrically both with respect to the first axis and with respect to the second axis, the method comprising:
applying a first periodic voltage signal to a first piezoelectric actuator unit of the at least four piezoelectric actuator units; and
applying a second periodic voltage signal to a second piezoelectric actuator unit of the at least four piezoelectric actuator units;
wherein:
the first and second voltage signals are applied in such a way that an instantaneous amplitude of the second voltage signal is either equal to an instantaneous amplitude of the first voltage signal or is equal to the instantaneous amplitude of the first voltage signal multiplied by minus one; and
the application of the first and second voltage signals shifts the first and second piezoelectric actuator units in same or different ones of at least one of a first direction that is perpendicular to the first and second axes and an opposite second direction that is perpendicular to the first and second axes.

17. The method as recited in claim 16, further comprising:
applying a third periodic voltage signal to a third piezoelectric actuator unit of the at least four piezoelectric actuator units; and
applying a fourth periodic voltage signal to a fourth piezoelectric actuator unit of the at least four piezoelectric actuator units;
wherein the third voltage signal and the fourth voltage signal are applied in such a way that a respective instantaneous amplitude of the fourth voltage signal is either equal to a respective instantaneous amplitude of the third voltage signal or is equal to the respective instantaneous amplitude of the third voltage signal multiplied by minus one.

18. The method as recited in claim 17, wherein the first voltage signal and the third voltage signal are applied in such a way that a respective instantaneous amplitude of the third voltage signal is either equal to the respective instantaneous amplitude of the first voltage signal or is equal to the respective instantaneous amplitude of the first voltage signal multiplied by minus one.

19. A micromechanical device for two-dimensional deflection of light, the device comprising:
a first frame unit;
an actuator structure that includes at least four piezoelectric actuator units; and
a mirror unit that:
has a mirror surface for deflecting light striking the mirror surface; and
is rotatably situated about a first axis of rotation within, and fastened to, the first frame unit;
wherein:
the first frame unit is rotatably situated about a second axis of rotation within, and fastened to, the actuator structure;
the at least four piezoelectric actuator units are positioned symmetrically both with respect to the first axis and with respect to the second axis;
the actuator structure includes free longitudinal ends; and
any one or more of the following three features (a)-(c):
(a) the actuator structure includes two U-shaped sections, each having two of the free ends;
(b) each of the piezoelectric actuator units is arranged with a respective end of the respective piezoelectric actuator unit at a different respective one of the free longitudinal ends that those of the each of the other ones of the piezoelectric actuator units; and
(c) for respective pairs of adjacent ones of the free longitudinal ends, the first axis extends between the free longitudinal ends of the respective pair.

20. The device as recited in claim 19, wherein the actuator structure includes the two U-shaped sections, each having two of the free ends.

21. The device as recited in claim 19, further comprising an outer frame that surrounds and is connected to the actuator structure.

22. The device as recited in claim 19, wherein different ones of the at least four piezoelectric actuator units are simultaneously movable into different planes that are non-parallel to each other.

23. The device as recited in claim 19, wherein each of the piezoelectric actuator units is arranged with the respective end of the respective piezoelectric actuator unit at a different respective one of the free longitudinal ends that those of the each of the other ones of the piezoelectric actuator units.

24. The device as recited in claim 19, wherein, for the respective pairs of adjacent ones of the free longitudinal ends, the first axis extends between the free longitudinal ends of the respective pair.

* * * * *